United States Patent
Fitzgerald et al.

(10) Patent No.: US 11,558,179 B2
(45) Date of Patent: Jan. 17, 2023

(54) DISTRIBUTED DATA STORAGE

(71) Applicant: Nokia Technologies Oy, Espoo (FI)

(72) Inventors: Edward Fitzgerald, Lower Cambourne (GB); Karina Palyutina, Cambridge (GB); Enrique Martin Lopez, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 507 days.

(21) Appl. No.: 16/534,514

(22) Filed: Aug. 7, 2019

(65) Prior Publication Data
US 2020/0052887 A1 Feb. 13, 2020

(30) Foreign Application Priority Data

Aug. 9, 2018 (EP) ........................................ 8250015

(51) Int. Cl.
*H04L 29/06* (2006.01)
*H04L 9/06* (2006.01)
(Continued)

(52) U.S. Cl.
CPC .......... *H04L 9/0637* (2013.01); *H03M 7/702* (2013.01); *H04L 9/0643* (2013.01); *H04L 9/50* (2022.05)

(58) Field of Classification Search
CPC ................. H04L 9/0637; H04L 9/0643; H04L 2209/38; H04L 9/3239; H03M 7/702;
(Continued)

(56) References Cited

U.S. PATENT DOCUMENTS

| | | | | |
|---|---|---|---|---|
| 2015/0281752 | A1* | 10/2015 | Van Veldhuisen ... | H04N 21/233 725/116 |
| 2018/0026651 | A1* | 1/2018 | Gopal .................. | G02B 6/4452 341/51 |
| 2018/0189333 | A1* | 7/2018 | Childress .................. | H04L 9/50 |

(Continued)

FOREIGN PATENT DOCUMENTS

| CN | 106686087 A | 5/2017 |
|---|---|---|
| CN | 107079059 A | 8/2017 |

(Continued)

OTHER PUBLICATIONS

Lei Fan et al., "A Scalable Proof-of-Stake Blockchain in the Open Setting" Eurocrypt 2018, IACR Cryptol. ePrint Arch. Apr. 25, 2018, pp. 1-55 (Year: 2018).*

(Continued)

*Primary Examiner* — Harunur Rashid
(74) *Attorney, Agent, or Firm* — Laine IP Oy

(57) ABSTRACT

According to an example aspect of the present invention, there is provided a method, comprising: receiving an input ordered set of transactions after a genesis block or a preceding compressed block in a chain of blocks, generating a compressed block on the basis of the input ordered set of transactions, wherein processing of the compressed block results to an equivalent final state as processing of the input ordered set of transactions, and providing the compressed block to a distributed network for establishing a new chain epoch and replacing a set of uncompressed blocks associated with the input ordered set of transactions.

7 Claims, 7 Drawing Sheets

(51) Int. Cl.
*H03M 7/30* (2006.01)
*H04L 9/00* (2022.01)

(58) Field of Classification Search
CPC ...... G06F 21/64; G06F 16/27; G06F 16/2255; G06Q 20/382
See application file for complete search history.

(56) References Cited

U.S. PATENT DOCUMENTS

| | | | |
|---|---|---|---|
| 2018/0218027 A1* | 8/2018 | Cronie | G09C 1/00 |
| 2019/0156301 A1* | 5/2019 | Bentov | H04L 9/3239 |
| 2019/0164153 A1* | 5/2019 | Agrawal | G06Q 20/383 |

FOREIGN PATENT DOCUMENTS

| | | | | |
|---|---|---|---|---|
| CN | 107181797 | A | | 9/2017 |
| CN | 107728941 | * | 9/2017 | ........... G06F 3/0608 |
| CN | 107423426 | A | | 12/2017 |
| CN | 107728941 | A | | 2/2018 |
| EP | 3355513 | A1 | | 8/2018 |

OTHER PUBLICATIONS

Fan et al., "Blockchain-based efficient privacy preserving and data sharing scheme of content-centric network in 5G" IET Communications, ISSN 1751-8628, E-First on Feb. 28, 2018, pp. 1-6, (Year: 2018).*

"Checkpoint Lockin", Bitcoin, Retrieved on Jul. 11, 2019, Webpage available at: https://en.bitcoin.it/wiki/Checkpoint_Lockin.

"Compressed Blocks in Blockchain only with Unspent TXs", Bitcoin Forum, Retrieved on Jul. 11, 2019, Webpage available at: https://bitcointalk.org/index.php?topic=712832.0.

Palai et al., "Empowering Light Nodes in Blockchains with Block Summarization", 9th IFIP International Conference on New Technologies, Mobility and Security (NTMS), Feb. 26-28, 2018, 5 pages.

Extended European Search Report received for corresponding European Patent Application No. 18250015.7, dated Jan. 16, 2019, 6 pages.

Office action received for corresponding European Patent Application No. 18250015.7, dated Dec. 9, 2020, 4 pages.

* cited by examiner

DISTRIBUTED DATA STORAGE

FIELD

The present invention relates to distributed data storages, and further to storing data in systems applying chains of blocks as data structures.

BACKGROUND

Blockchains are increasingly applied for recording transactions without relying to a centralized entity. Changes in resource ownership in a blockchain network take the form of blockchain transactions secured by strong cryptography. Information provided in a blockchain transaction may be stored as a new block in the blockchain in response to validation of the respective blockchain transaction. Blockchain state information shared by the nodes may store all transactions and history carried out in the blockchain network. Application of blockchain technology and the ledger enable a way to track the unique history of transactions by the individual nodes in the network.

Blockchains generally provide a completely auditable log that includes every single transaction ever done in a blockchain network, which is very useful in a number of use cases. However, due to this nature, scalability of blockchains is affected by their ever-growing size due to new transactions.

SUMMARY

The invention is defined by the features of the independent claims. Some specific embodiments are defined in the dependent claims.

According to a first aspect, there is provided a method, comprising: receiving an input ordered set of transactions after a genesis block or a preceding compressed block in a chain of blocks, generating a compressed block on the basis of the input ordered set of transactions, wherein the processing of the compressed block results to an equivalent final state as processing of the input ordered set of transactions, and providing the compressed block to a distributed network for establishing a new chain epoch and replacing a set of uncompressed blocks associated with the input ordered set of transactions.

According to a second aspect, there is provided a method, comprising: detecting a compressed block added in a chain of blocks, the compressed block establishing a new chain epoch after a genesis block or a preceding compressed block and provided for the chain to replace uncompressed blocks associated with an input ordered set of transactions, checking, after detecting the compressed block, if a predetermined condition for removing one or more blocks of one or more earlier epochs in the chain is met, and removing one or more blocks of one or more earlier epochs in the chain in response to the predetermined condition being met.

According to a third aspect, there is provided an apparatus, comprising at least one processing core, at least one memory including computer program code, the at least one memory and the computer program code being configured to, with the at least one processing core, cause the apparatus at least to: receive an input ordered set of transactions after a genesis block or a preceding compressed block in a chain of blocks, generate a compressed block on the basis of the input ordered set of transactions, wherein the processing of the compressed block results to an equivalent final state as processing of the input ordered set of transactions, and provide the compressed block to a distributed network for establishing a new chain epoch and replacing a set of uncompressed blocks associated with the input ordered set of transactions.

According to a fourth aspect, there is provided an apparatus comprising at least one processing core, at least one memory including computer program code, the at least one memory and the computer program code being configured to, with the at least one processing core, to cause the apparatus at least to: detect a compressed block added in a chain of blocks, the compressed block establishing a new chain epoch after a genesis block or a preceding compressed block and provided for the chain to replace uncompressed blocks associated with an input ordered set of transactions, check, after detecting the compressed block, if a predetermined condition for removing one or more blocks of one or more earlier epochs in the chain is met, and remove one or more blocks of one or more earlier epochs in the chain in response to the predetermined condition being met.

According to a fifth aspect, there is provided a computer program product, a computer readable medium, or a non-transitory computer readable medium comprising program instructions for causing an apparatus to perform at least the following: receive an input ordered set of transactions after a genesis block or a preceding compressed block in a chain of blocks, generate a compressed block on the basis of the input ordered set of transactions, wherein the processing of the compressed block results to an equivalent final state as processing of the input ordered set of transactions, and provide the compressed block to a distributed network for establishing a new chain epoch and replacing a set of uncompressed blocks associated with the input ordered set of transactions.

According to a sixth aspect, there is provided a computer program product, a computer readable medium, or a non-transitory computer readable medium comprising program instructions for causing an apparatus to perform at least the following: detect a compressed block added in a chain of blocks, the compressed block establishing a new chain epoch after a genesis block or a preceding compressed block and provided for the chain to replace uncompressed blocks associated with an input ordered set of transactions, check, after detecting the compressed block, if a predetermined condition for removing one or more blocks of one or more earlier epochs in the chain is met, and remove one or more blocks of one or more earlier epochs in the chain in response to the predetermined condition being met.

In an embodiment according to any one of the aspects, the set of uncompressed blocks comprises the input ordered set of transactions, and the compressed block is generated in response to a reaching a predetermined number of ordered blocks and/or transactions added to the chain after a genesis block or a preceding compressed block.

In an embodiment according to any one of the aspects, the generating the compressed block comprises generating one or more new compressed transactions for the compressed block. The one or more new compressed transactions may be signed by a miner node generating the compressed block.

In an embodiment according to any one of the aspects, the compressed transactions are associated with a transaction type unique for compressed transactions.

In an embodiment according to any one of the aspects, the removing of the one or more blocks comprises removing compressed and uncompressed blocks belonging to one or more earliest epochs in the chain.

In an embodiment according to any one of the aspects, the checking the predetermined condition comprises checking if the chain comprises a given number of compressed blocks or chain epochs and/or checking if a given time has passed since the first compressed block or a genesis block in the chain.

In an embodiment according to any one of the aspects, the compressed block comprises fewer transactions than the input ordered set of transactions, the compressed block is a parent of an uncompressed block, and the compressed block is a child of a genesis block.

In an embodiment according to any one of the aspects, the compressed block is introduced to the distributed network with an uncompressed block referencing to the compressed block.

In an embodiment according to any one of the aspects, the compressed block is or may be validated by checking transaction types and final state of the compressed block.

In an embodiment according to any one of the aspects, interval for starting a new chain epoch in the chain, which may refer e.g. to time interval, compressed block interval, or number of uncompressed blocks in the input set, is adjustable in the distributed network on the basis of one or more of network characteristics, transaction statistics, compressed block characteristics, and network voting decisions.

In an embodiment according to any one of the aspects, number of chain epochs maintained in the chain is adjustable in the distributed network on the basis of one or more of network characteristics, transaction statistics, compressed block characteristics, and network voting decisions.

In an embodiment according to any one of the aspects, the detected compressed block is validated and has been generated on the basis of the input ordered set of transactions and the processing of the compressed block results to an equivalent final state as processing of the input ordered set of transactions of the replaced uncompressed blocks.

EMBODIMENTS

There are now provided an improved structure and associated methods and apparatuses for facilitating reducing size of chain of blocks for a distributed network.

In some embodiments, the distributed network is a blockchain network and nodes of the distributed network are configured to operate as blockchain (BC) nodes and store a local blockchain database. The nodes may validate and commit transactions in order to reach consensus. A blockchain transaction may comprise an identifier of a new owner, that is the recipient, of the resource, together with a cryptographic signature of the previous owner, that is the sender, such that malicious attackers cannot re-assign resources they do not own.

A node establishing a new block may be referred to as a miner node. A miner node may compile a set of transactions, which it receives from broadcasts in the network, for the next block. In a case of proof of work (PoW) based system, the miner node may search for a proof-of-work code that covers all the transactions in the set of transactions for the next block. For example, the PoW code may be a numerical value, with which the contents of the next block, that is, the set of transactions, hashes to a value that is less than a threshold. Once a miner discovers the PoW, it can publish the block, which other nodes of the system will then add to the blockchain as the new most recent established block with a PoW field. In case the miner node discovers a PoW based on an incomplete set of transactions, for example if some transactions did not reach the miner node, other nodes in the network will not accept the block into the blockchain, and it will be excluded from a consensus version of the blockchain in the system.

Figure 1:
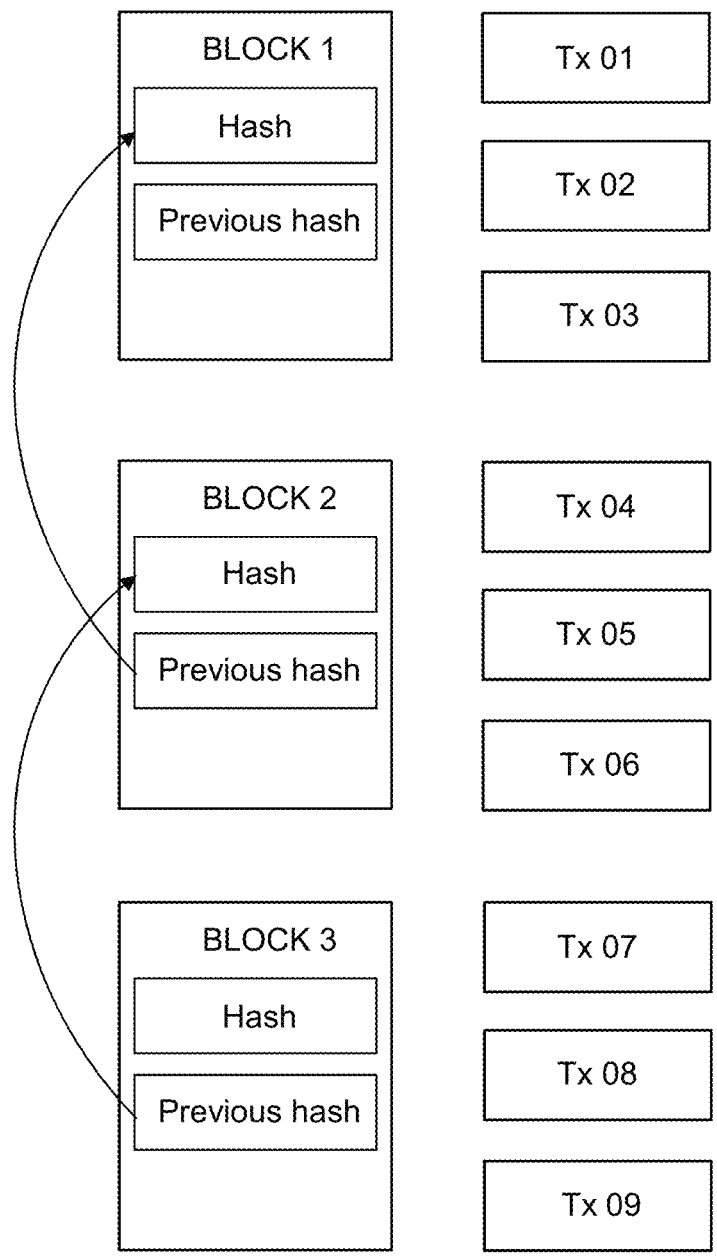
FIG. 1 illustrates a blockchain data structure.

FIG. 1 illustrates a blockchain data structure. In this structure a block contains zero or more transactions Tx and is uniquely identified by a hash/digest of the complete block structure. The graph of blocks is formed based on the references to previous hash values, which are part of the headers of each block. Hashes linking the blocks together to form a chain may be referred to as Merkle hashes. Maliciously modifying a transaction in a block far down the chain would involve re-doing the work of finding proofs for all subsequent blocks, since the input to the hash function for the block comprising the transaction would be changed, causing the resulting hash value, with the proof in that block, to no longer be disposed in the desired area in the output space of the hash function.

Recording of every single transaction ever carried out in a blockchain network not only poses a storage burden, but it also imposes a computational burden. When a new full miner node joins the network it needs to validate all the previous transactions that have been seen by the network so that it has a complete picture of the state of the network, which is required before mining can start.

A new type of block is now introduced for a chain of blocks for distributed networks, referred herein as a compressed block. A concept of chain epochs is also introduced. At the start of each chain epoch a compressed block may be generated.

Figure 2:
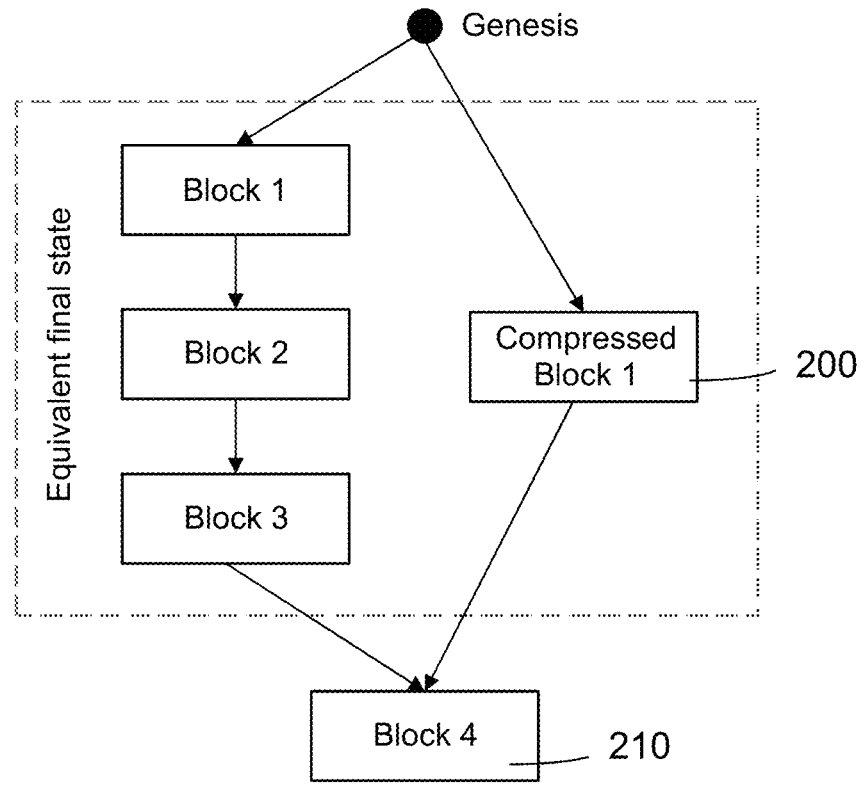
FIG. 2 illustrates a chain of blocks in accordance with at least some embodiments.

FIG. 2 illustrates a simplified example of application of a compressed block 200. Blocks 1-4 are uncompressed blocks. A compressed block 200 comprises a set of transactions, whose application results in equivalent state as applying all the transactions that have occurred earlier, in the previous epochs. Hence, processing of the compressed block 200 results to an equivalent final state as processing of the input ordered set of transactions in Blocks 1 to 3.

The compressed blocks 200 may be very similar to normal, uncompressed blocks, but with some differences or restrictions. In some embodiments the compressed block 200 is a parent of a normal block 210 and a child of the genesis block. The compressed block comprises zero or more transactions, which may be referred to as compressed transactions. Since there are various alternatives for implementing the compression, as illustrated further below, the term compressed transaction may refer to a transaction in a (compressed) set of transactions after compression or to an individual transaction after it has been compressed.

Figure 3:
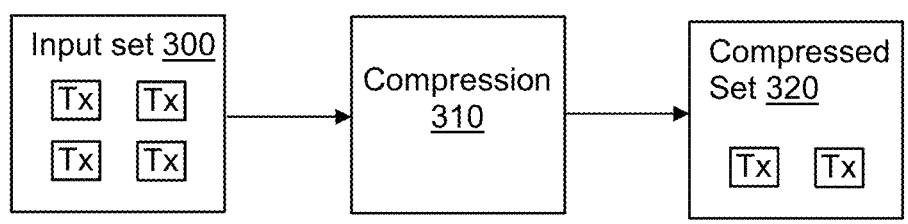
FIG. 3 illustrates processing of transactions for a chain of blocks in accordance with at least some embodiments.

With reference to FIG. 3, compressed transaction sets are generated by processing an ordered input set 300 of transactions through a compression stage by a compression algorithm or unit 310. The output from this process is a new (compressed) set 320 of transactions, which typically includes fewer transactions and may form the compressed block 200. These new transactions are generated in such a way that the processing of the transactions in the compressed set 320 leads to the same final state as processing of the input set 300 of transactions (since the previous compressed block or genesis block). With reference to the example of FIG. 2, this means that if a node applied the transactions in Blocks 1, 2 and 3, it would arrive at exactly the same state as applying the transactions in the compressed Block 200.

Figure 4:
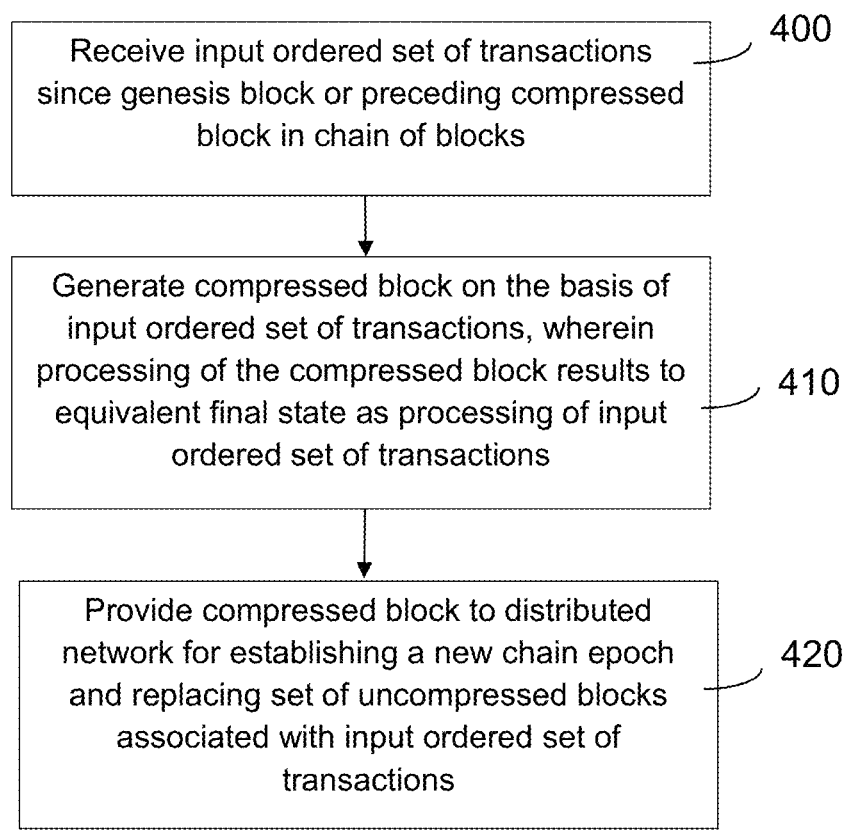
FIG. 4 illustrate a method in accordance with at least some embodiments.

FIG. 4 illustrates a method according to some embodiments. The method may be for compressing a chain of blocks and implemented in an apparatus or device connectable to a distributed network, generating new blocks for a chain of blocks in a distributed network, such as a blockchain miner node. For example, the apparatus may be a user device, a wireless network device, a server, a network operator device, an authority device, or a set of devices co-operatively performing the method.

The method comprises receiving 400 an input ordered set of transactions after a genesis block or a preceding compressed block in a chain of blocks. A compressed block is generated 410 on the basis of the input ordered set of transactions, wherein processing of the compressed block results to an equivalent final state as processing of the input ordered set of transactions. The compressed block is provided 420 to a distributed network for establishing a new chain epoch and replacing a set of uncompressed blocks associated with the input ordered set of transactions. The set of uncompressed blocks may comprise the input ordered set of transactions. The compressed block may, in or after block 420, be sent or otherwise provided for further node(s) of the distributed network for publication in the distributed network.

The compressed block may be generated 410 in response to reaching a predetermined number of ordered blocks and/or transactions added to the chain after a genesis block or a preceding compressed block. A maximum number of transactions may be defined per block. However, it is to be appreciated that block 410 may also be entered in response to another trigger, such as overall size of the chain. The triggering condition for generating the compressed block may be dynamically adjustable, by the miner node implementing the method or other authorized node(s).

The compression process 310, 410 may be implemented on the basis of the state and/or smart contract logic of the distributed network in question. The generation 410 of the compressed block may comprise generating one or more new compressed transactions for the compressed block, and signing the one or more new compressed transactions by a miner node generating the compressed block. In some embodiments, the input ordered set of transactions is filtered, and annulling transactions are removed.

This process of compressing the transactions may be lossy, due to potentially losing individual details of transactions, while preserving the final state. Thus, the present functionality might not be applicable to all use cases but it offers a substantial advantage for use cases in which full provenance of transactions is not required and can be sacrificed for speed or lower storage.

A very simple compression use case example: Given a network is maintaining records of DVD rentals. Transactions are issued to a blockchain when DVD is rented and returned to the store. This type of use case where there is an inherent consolidation process lends itself well to compression. Given the following set of input transactions to the compression process:

1. Sally rents DVD A.
2. June rents DVD B.
3. John rents DVD C.
4. June returns DVD B.
5. Sally returns DVD A.

For this set of input transactions, the compression process/unit 310, 410 can simply remove all entries which have been consolidated in this window. This would leave a single new transaction of:

1. John rents DVD C.

Both sets of transactions, once applied, result in the same final state of the system.

In the example above, compression could be performed by simply filtering the transaction log and leaving the remaining transactions that do not cancel out. This option for the compression process/unit 310, 410 allows the transaction signatures to be maintained.

However, in order for a miner node to perform the required compression, it may need to create new transactions. In this case, these new transactions need to be signed by the miner node. While initially this concept might limit adoption, it should be noted that because all the other nodes in the network verify the chain, it would still require 51% of the network to be malicious in order to change history.

A specific category or identity may be established and required for miner nodes authorized to create the transactions for the compressed blocks. The miner nodes need to generate the compressed blocks such that the processing of the compressed block transactions 320 leads to the equivalent final state as processing of the input transaction set 300. The compliance of the miner nodes to general compressed block generation rules may be ensured by a modified consensus block verification method, such as by applying at least some of the features illustrated in connection with FIG. 8.

While the exact nature of the transactions would be domain specific, special transaction types unique for compressed blocks may be applied. The new compressed transactions may be associated with a transaction type unique for compressed transactions. The specific transaction types may be required in order to efficiently compress the sum of transactions. For example, in the context of a simple token tracking application, where the normal transactions might be limited to token transfers, a series of transactions explicitly setting the balance may be required in order to efficiently compress the transactions:

1. Alice sends 3 tokens to Bob.
2. Bob sends 3 tokens to Charlie.
3. Charlie sends 3 tokens to Diana.
4. Bob sends 3 tokens to Alice.
5. Charlie sends 3 tokens to Bob.

The transactions 1-5 may be compressed to:

6. Charlie balance reduced by 3.
7. Diana balance increased by 3.

Given the presence of these specific compressed transactions, the validation mechanism of the network is configured to ensure that the compressed transactions are only present in compressed blocks.

Figure 5:
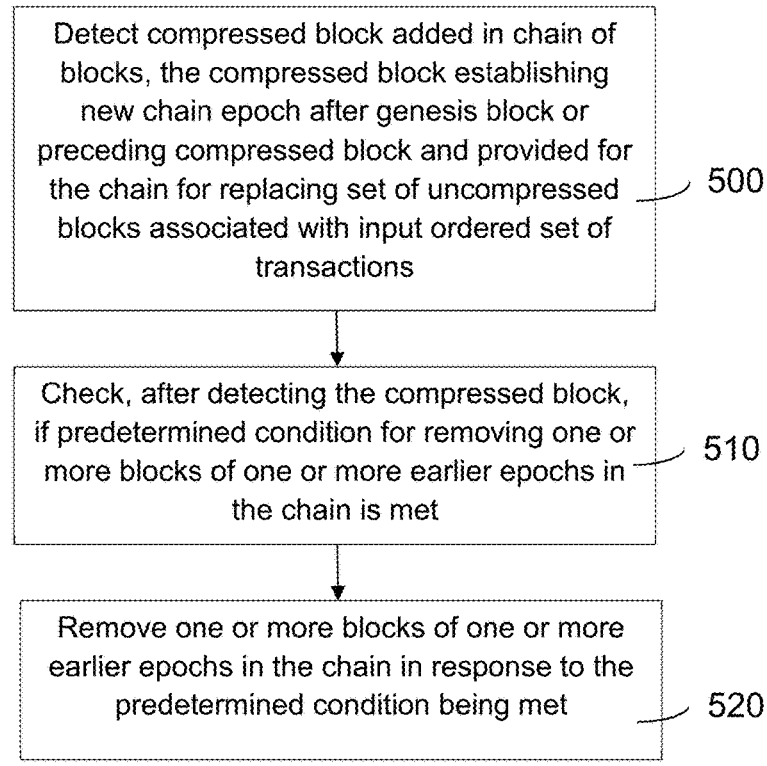
FIG. 5 illustrates a method in accordance with at least some embodiments.

FIG. 5 illustrates a method according to some embodiments. The method may be for controlling size of a chain of blocks and implemented in an apparatus or device connectable to a distributed network and storing a chain of blocks in a distributed network, such as a blockchain node. For example, the apparatus may be a user device, an IoT or M2M device, a wireless network device, a server, a network operator device, an authority device, or a set of devices co-operatively performing the method.

The method comprises detecting 500 a compressed block added in a chain of blocks, the compressed block establishing a new chain epoch after a genesis block or a preceding compressed block and provided for the chain for replacing a set of uncompressed blocks associated with an input ordered set of transactions. The compressed block may have been generated 410 on the basis of the input ordered set of transactions as illustrated in connection with FIG. 4 and validated by miner nodes in the distributed network.

After detecting the compressed block, the method checks 510 if a predetermined condition for removing one or more blocks of one or more earlier epochs in the chain is met. In response to the predetermined condition being met, one or more blocks of one or more earlier epochs in the chain are removed 520. Thus, blocks in the earliest/oldest epoch(s) remaining in the chain may be removed.

The predetermined condition may be associated with compressed blocks in the chain. The checking the predetermined condition may comprise checking if the chain comprises a given number of compressed blocks or chain epochs. The nodes may be configured with a minimum and/or maximum number of compressed blocks or chain epochs to be maintained. The checking the predetermined condition may comprise checking if given, predetermined time has passed since a given block, such as the first compressed block or a genesis block in the chain. However, it is to be appreciated that other triggering conditions may be applied in 510 and 520 instead or in combination of these example embodiments, such as overall size of the blockchain. The condition may be dynamically adjustable, by an authorized node or by consensus of nodes in the distributed network, and/or automatically in response to one or more condition adjusting triggers.

It will be appreciated that a number of further steps and embodiments may be applied in connection with the methods in FIGS. 4 and 5 and by the apparatus configured for performing the method(s), some of which are illustrated further below. It will be also appreciated that there may be further steps regarding block verification after issuing or providing the compressed block to the distributed network. The compressed block may be published at the distributed ledger and the method may proceed to a subsequent step only after successful verification.

Figure 6:
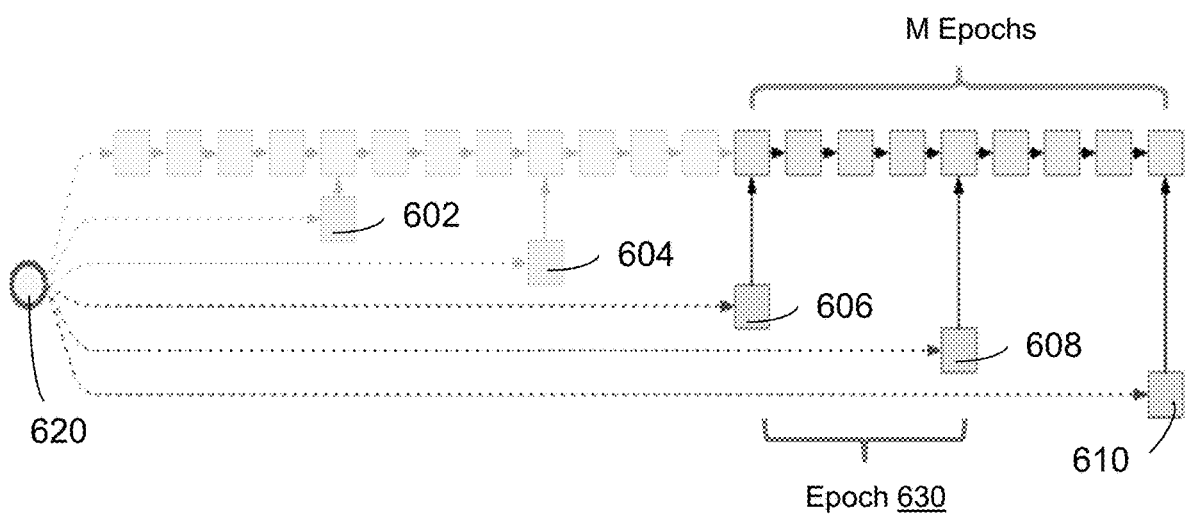
FIG. 6 illustrates a chain of blocks in accordance with at least some embodiments.

With reference to the example chain of FIG. 6, compressed blocks 602, 604, 606, 608, 610 based on a genesis block 620 may be generated by miner nodes. Variable C may be defined as the number of blocks for (causing) generating of a compressed block. C may thus refer to the number of regular blocks (in the input set 300) that are synthesized into a compressed one. Thus, the compressed blocks may be generated at the given internal compressed block interval C. In the example of FIG. 2, C=3, and in the example of FIG. 6, C=4.

At the point at which a miner node adds a new compressed block, such as block 606 to the chain, this is to be the start of a new chain epoch 630. A chain epoch may thus be defined as the interval between two compressed blocks.

In some embodiments, because of the state equivalence properties of the new chain, nodes may now be configured to remove uncompressed blocks in favor of the verified compressed blocks. This comes at an obvious cost of sacrificing provenance of every transaction (information about some transactions may be lost when compressing, although the resulting balances are identical) but allows the network to set a limit on the number of blocks that are kept, which reduces the storage requirements of the blockchain.

In some embodiments, after a predetermined time (which may be reasonably short) since the earliest compressed block remaining in the chain (or since the genesis block), the network may thus start to remove 520 or ignore old blocks. Both compressed and uncompressed may be removed. This process of shedding of redundant blocks ultimately curtails the growth of the chain. In this sense the network is constantly creating and verifying new potential starting (epoch) points for the network. This is a substantial advantage over existing solutions since:

The rolling chain epochs may be verified across the whole network (because they are tightly integrated into the consensus mechanism).

The period for a chain epoch can be controlled dynamically across the network.

The period after which blocks are removed or forgotten can also be controlled dynamically, allowing the network to tightly control the properties of the chain.

Variable M may refer to the minimum number of epochs that each network node should maintain. M thus defines also the number of compressed blocks, and, by extension, affects the number of transactions maintained. In the simple example of FIG. 6, M=2.

In a conventional blockchain setting, the chain length (number of blocks added to the genesis block) would be given as follows, where B is the rate at which blocks are generated in the network and t is time.

$$L_N(t)=[B,t]$$

By applying at least some of the presently disclosed features, the chain length (again defined as number of blocks added to the genesis block) may be defined as:

$$L_C(t) = L_N(t) - \text{Ramp}\left[\left(\left\lfloor \frac{L_N(t)}{C} \right\rfloor - M\right)C\right] + \left\lfloor \frac{L_N(t)}{C} \right\rfloor - \text{Ramp}\left[\left\lfloor \frac{L_N(t)}{C} \right\rfloor - M\right]$$

where $$\text{Ramp}(x) = \begin{cases} x, & x > 0 \\ 0, & \text{otherwise} \end{cases}$$

The expression for $L_C(t)$ can be simply understood as (length of uncompressed chain)−(blocks removed from uncompressed chain)+(compressed blocks added)−(unnecessary compressed blocks removed).

The limit of the chain size may be defined as:

$$\lim_{t \to \infty} L_c(t) = M(C+1)$$

This is the expected asymptotic behaviour for the number of blocks added to the genesis block: number of uncompressed blocks for M epochs (MC), together with the M compressed corresponding to each epoch.

Figure 7:
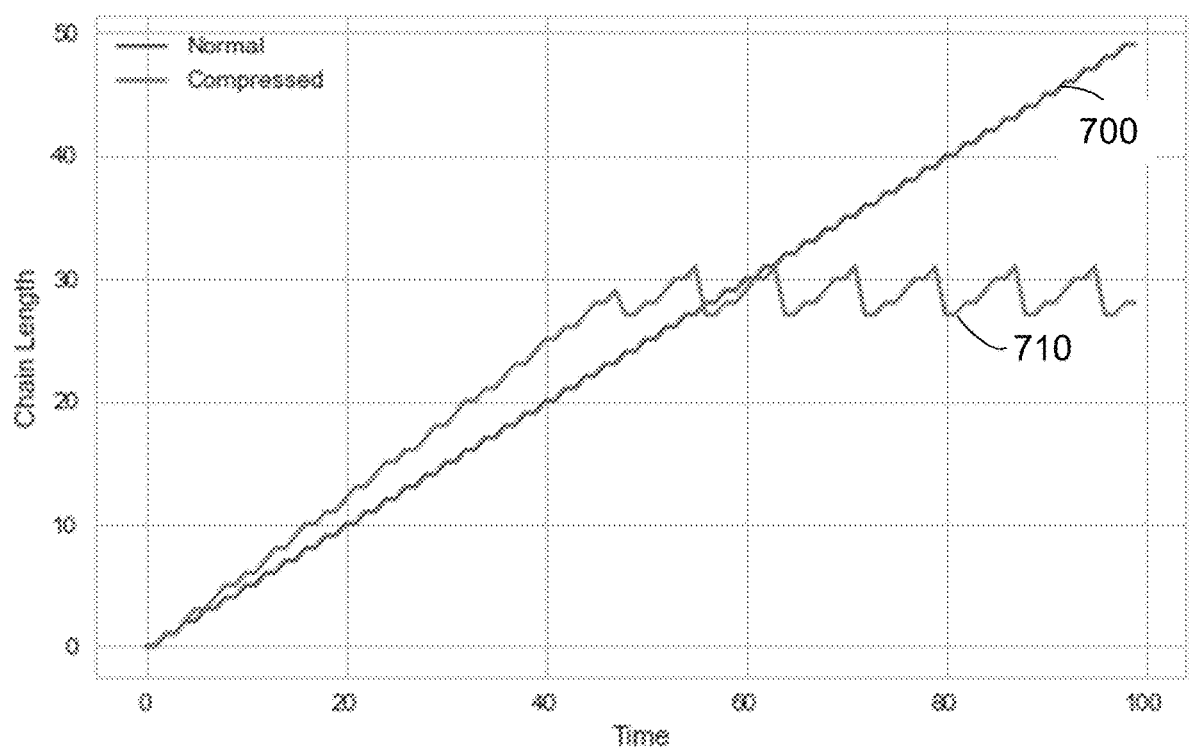
FIG. 7 illustrates chain growth when applying block compression according to at least some embodiments.

FIG. 7 illustrates chain growth when applying block compression according to at least some embodiments. The chain 710 that is using compression will initially grow faster than an uncompressed chain 700. The nodes may be configured to begin to remove or forget the earliest epochs and blocks once the chain or network has reached the desired number of epochs. At this point the length of the chain will plateau.

This shows that careful tuning of the M and C parameters allow the network to balance both the frequency of compression events and the overall length of the uncompressed transaction log. The achieved plateau refers to the number of blocks kept in the chain, without referring to the total size (in memory) of these blocks. In this sense it is to be noticed that the size of the most recent compressed blocks will still grow at most linearly, with savings in storage determined by the compressibility of the transactions.

While for the purposes of explanation, M and C have been kept at fixed values, this does not need to be the case and M and/or C may be variable. In some embodiments, one or both of these parameters are controlled via a smart contract in the distributed network. This allows arbitrarily complicated logic to be assigned to update these parameters. Some non-limiting examples of affecting criteria which may be applied for the updating include:

Network voting decisions
Transaction statistics (input rate, type distributions, etc)
Compressed block characteristics (generation time, compression efficiency, etc), and/or
Network characteristics (latency etc).

Such flexibility is of substantial advantage and allows the distributed network to adjust its characteristics over time. This adaptability allows the network to evolve with the demands placed on it by its users.

In some embodiments, the apparatus configured to carry out the method of FIGS. 4 and/or 5 is configured to maintain one or more epochs 630 in the chain instead of removing the epoch(s) or blocks in the epoch(s). There may be an additional check for need of maintaining the epoch(s) e.g. after block 520. One or more epoch-preserving conditions or triggers may be set, and the epoch(s) is maintained in response to detecting such condition(s) or trigger(s) being met. For example, specific transaction class(es) may be configured to be maintained. Thus, the provenance of the specific epochs or transactions of such class(es) in the epochs may be guaranteed, such as tax payments or legal contract transactions. In some embodiments, a transaction may be marked as non-compressible. For example, a specific information element indicative of incompressibility (or alternatively compressibility) may be included in the transactions. There may be a specific class of for incompressible blocks. In another option, transactions that need to be tracked are identified and stored (as originally signed) locally.

Figure 8:
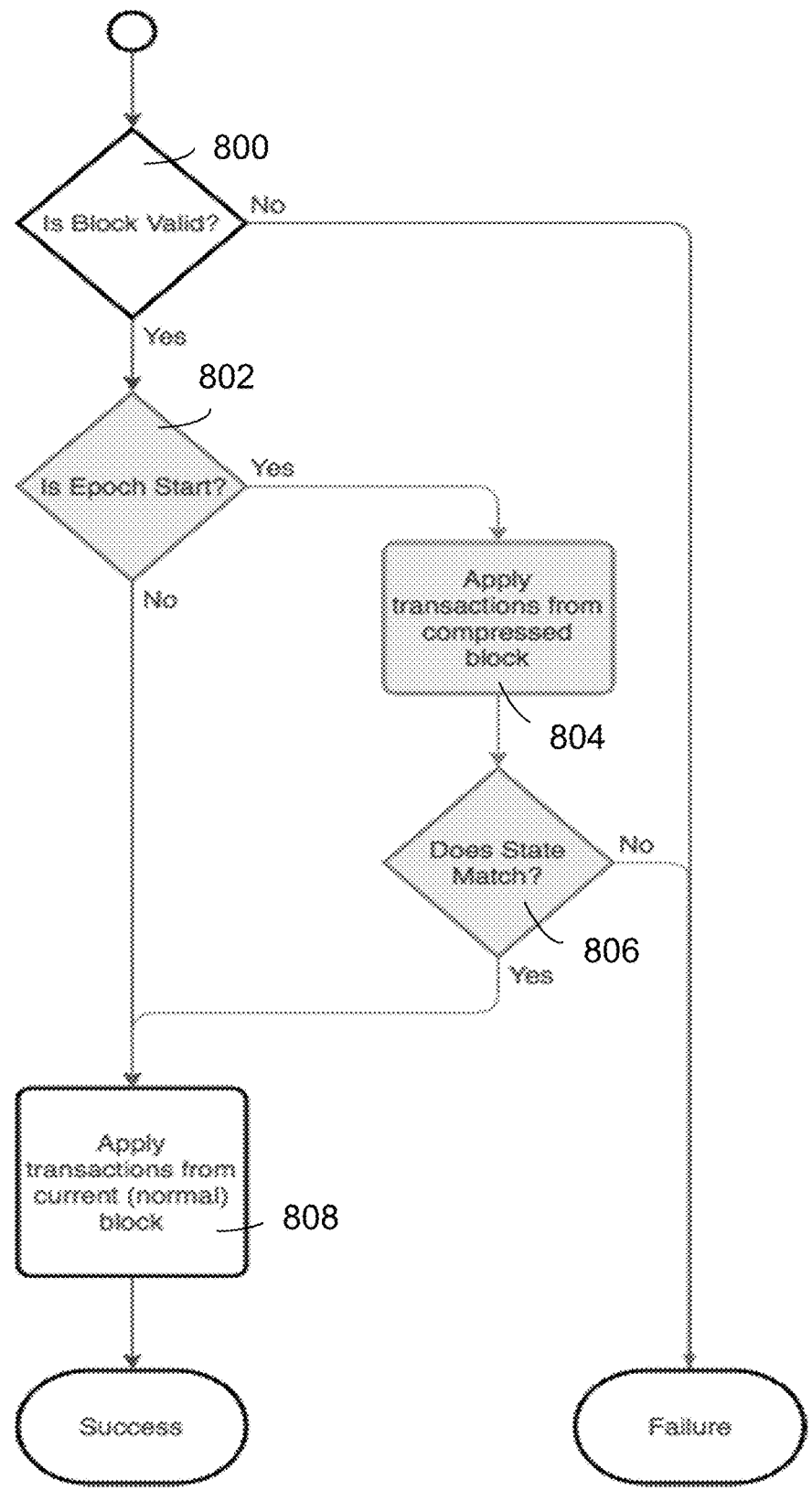
FIG. 8 illustrates a method in accordance with at least some embodiments.

Verification of compressed blocks is carried out in the network in order to validate the incoming block. In some embodiments, the compressed block is introduced to the network when a normal (uncompressed) block is transmitted to the network with a reference to it. The validation of these blocks can be integrated into an existing block validation scheme. An example of a method for block validation flow is illustrated in FIG. 8. The method may be carried out by a miner node after a compressed block is provided 420 to the distributed network.

According to some embodiments, two main checks are performed for verifying compressed blocks: Validation of the transactions types in block 800 and validation of final state in block 806.

As part of the validation process a verification algorithm may be configured to check in block 800 the contents of the transactions that were contained inside the blocks. The exact nature of the verification step may depend of the chosen compression stage. However, the following general checks may be carried out:

Check that only compressed transactions are permitted in compressed blocks.
Ensure that compressed transactions are correctly signed.

If any of the checks fail, then the whole block is rejected by the node performing the verification and ultimately by the distributed network. In response to detecting a compressed block, i.e. start of a chain epoch in 802, the transactions in the compressed block are applied 804 for verifying the final state.

There are a number of available options for verifying the final state. In some embodiments, two candidate states are compared by comparing state hashes. For a candidate state a deterministic process is followed for combing all the state elements together. The output of this process is a hash digest that summarizes the total state. This process can be applied to two candidate states, after this a binary comparison of the state hashes can be done in order to check the final state. If the binary comparison does not match, the final state cannot be verified and therefore the block is rejected by the node.

In PoW based consensus schemes, where each block provides a proof to all the nodes in the network that some work has been done in the generation of this block, the addition of a new compressed block at the start of the network epoch would be costly since a naïve approach would mean doubling the proof work. However, due to the fact that the compressed block is always introduced to the network with an uncompressed block, it is reasonable to delegate the proof requirements to this uncompressed block. Therefore, in some embodiments the validation of compressed blocks is formed solely on the final state equivalence check and that the nonce for all compressed blocks is fixed at zero.

Although discussed above in terms of PoW, in some embodiments a proof of stake (PoS) may be used instead of, or additionally to, a PoW. In a proof-of-stake based system, a new block is accepted once a sufficient fraction of resources are proven as owned by nodes ready to accept the new block version.

However, at least some of the above-illustrated features are applicable also in other consensus schemes. Indeed, the consensus protocol of a blockchain platform can be generally separated from the data structure used in such platform. Presently disclosed features are widely applicable to most consensus protocols which feature a chain of blocks as data structure, such as PoW, PoS, and practical byzantine fault tolerance (PBFT) based consensus protocols.

An electronic device comprising electronic circuitries may be an apparatus for realizing at least some embodiments. The apparatus may be or may be comprised in a computer, a laptop, a tablet computer, a cellular phone, a machine to machine (M2M) device, a wearable device, a base station, access point device, a network management or control device, a server, or any other apparatus provided with communication capability. In some embodiments, the apparatus carrying out at least some of the above-described functionalities is comprised in such a device, e.g. the apparatus may comprise circuitry, such as a chip, a chipset, a microcontroller, or a combination of circuitries for or in any one of the above-described devices.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 9:
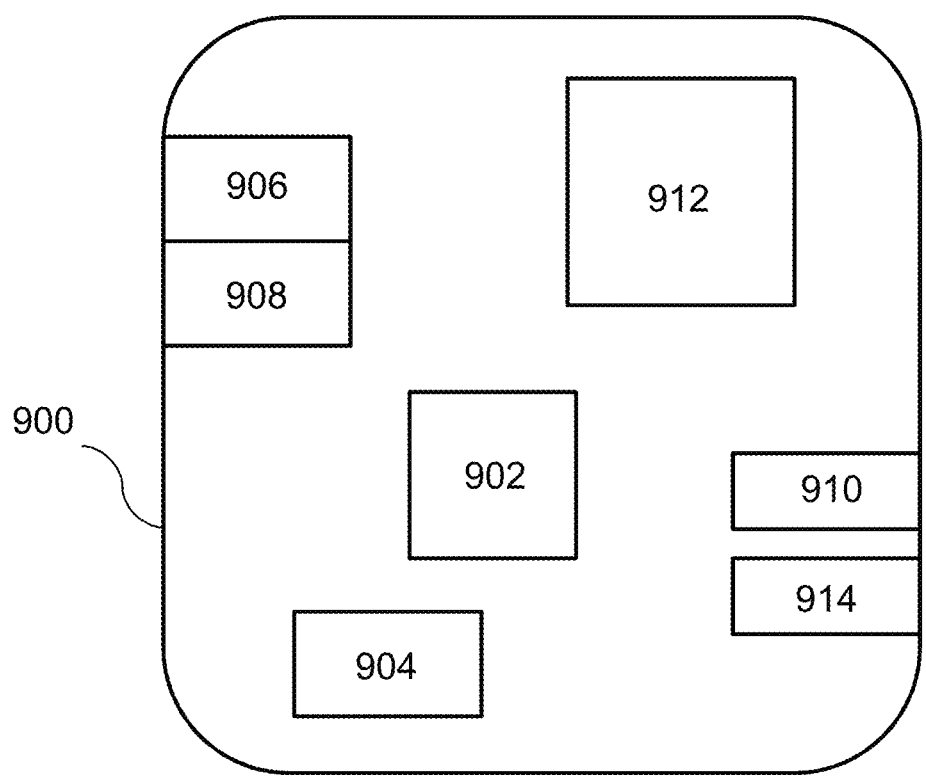
FIG. 9 illustrates an apparatus in accordance with at least some embodiments of the present invention.

FIG. 9 illustrates an example apparatus capable of supporting at least some embodiments of the present invention. Illustrated is a device 900, which may comprise a communications device, in some embodiments configured to operate as a node in a blockchain-based system. The device may be arranged to operate as a node configured to carry out at least some of the embodiments illustrated in connection with FIGS. 4 and/or 5. The device may include one or more controllers configured to carry out operations in accordance with at least some of the embodiments illustrated above, such as at least some of the features illustrated above in connection with FIGS. 1 to 8.

Comprised in the device 900 is a processor 902, which may comprise, for example, a single- or multi-core processor wherein a single-core processor comprises one processing core and a multi-core processor comprises more than one processing core. The processor 902 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions to carry out at least some of the presently disclosed features illustrated above.

The device 900 may comprise memory 904. The memory may comprise random-access memory and/or permanent memory. The memory may comprise at least one RAM chip. The memory may comprise solid-state, magnetic, optical and/or holographic memory, for example. The memory may be at least in part accessible to the processor 902. The memory may be at least in part comprised in the processor 902. The memory 904 may be means for storing information. The memory may comprise computer instructions that the processor is configured to execute. The memory, processor and computer program code may thus be configured to cause the device 900 to perform at least some of the presently disclosed features. The memory may be at least in part comprised in the processor. The memory may be at least in part external to the device 900 but accessible to the device. For example, control parameters affecting operations related to at least some of the above-illustrated features related to compressed blocks and related information may be stored in one or more portions of the memory and used to control operation of the apparatus.

Further, the memory may comprise device-specific cryptographic information, such as secret and public key of the device 900. The transactions may be signed with a private key associated with the respective device or user. The apparatus may be provided with a public-private key pair at manufacture. The private key may be stored on the certifying device's secured memory portion, such that it cannot be tampered with and the private key cannot be stolen. Moreover, the secured portion may also hold the hashing and signing logic.

The device 900 may comprise a transmitter 906. The device may comprise a receiver 908. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, wireless local area network, WLAN, and/or Ethernet standards, for example. The device 900 may comprise a near-field communication, NFC, transceiver 910. The NFC transceiver may support at least one NFC technology, such as NFC, Bluetooth, Wibree or similar technologies.

The device 900 may comprise user interface, UI, 912. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 904 or on a cloud accessible via the transmitter 906 and the receiver 908, or via the NFC transceiver 910, and/or to play games.

The device 900 may comprise or be arranged to accept a user identity module or other type of memory module 914. The user identity module may comprise, for example, a subscriber identity module, SIM, and/or a personal identification IC card installable in the device 900. The user identity module 914 may comprise information identifying a subscription of a user of device 900. The user identity module 914 may comprise cryptographic information usable to verify the identity of a user of device 900 and/or to facilitate encryption and decryption of communication effected via the device 900, such as private and/or public keys for creating and validating cryptographic signatures.

The processor 902 may be furnished with a transmitter arranged to output information from the processor, via electrical leads internal to the device 900, to other devices comprised in the device. Such a transmitter may comprise a serial bus transmitter arranged to, for example, output information via at least one electrical lead to memory 904 for storage therein. Alternatively to a serial bus, the transmitter may comprise a parallel bus transmitter. Likewise the processor may comprise a receiver arranged to receive information in the processor, via electrical leads internal to the device 900, from other devices comprised in the device 900. Such a receiver may comprise a serial bus receiver arranged to, for example, receive information via at least one electrical lead from the receiver 908 for processing in the processor. Alternatively to a serial bus, the receiver may comprise a parallel bus receiver.

The device 900 may comprise further devices not illustrated in FIG. 9. For example, the device may comprise at least one digital camera or other user media recording device. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 910 and/or the user identity module 914.

The processor 902, the memory 904, the transmitter 906, the receiver 908, the NFC transceiver 910, the UI 912 and/or the user identity module 914 may be interconnected by electrical leads internal to the device 900 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 1 to 8 may be taken in isolation or further combined together.

Various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in data storage systems.

ACRONYMS LIST

ASIC Application-specific integrated circuit
FPGA Field-programmable gate array
GSM Global system for mobile communication
IC Integrated Circuit
IoT Internet of Things
LTE Long term evolution
M2M Machine to machine
NFC Near-field communication
PBFT Practical byzantine fault tolerance
PoS Proof-of-stake
PoW Proof-of-work
UI User interface
WCDMA Wideband code division multiple access
WLAN Wireless local area network

The invention claimed is:

1. An apparatus comprising: at least one processor; and at least one memory including computer program code for one or more programs, the at least one memory and the computer program code configured to, with the at least one processor, cause the apparatus to perform at least the following:
   receive an input ordered set of blockchain transactions of a set of uncompressed blocks in a chain of blocks, the chain of blocks comprising the set of uncompressed blocks after a genesis block or a preceding compressed block in the chain of blocks,
   generate a compressed block on the basis of the input ordered set of the blockchain transactions, wherein the compressed block comprises less blockchain transactions than the input set of blockchain transactions and processing of blockchain transactions of the compressed block results to an equivalent final state as processing of the input ordered set of the blockchain transactions, and
   provide the compressed block to a distributed network to establish a new chain epoch and to replace the set of uncompressed blocks in the chain,
   wherein the at least one memory and the computer program code are further configured to, with the at least one processor, to cause the apparatus to generate the compressed block in response to reaching a predetermined number of at least one of: ordered blocks or blockchain transactions added to the chain after the genesis block or the preceding compressed block.

2. The apparatus of claim 1, wherein the generating of the compressed block further comprises, with the at least one memory, the computer program code and the at least one processor, to cause the apparatus to generate one or more new compressed transactions for the compressed block and signing the one or more new compressed transactions by a miner node generating the compressed block, wherein the compressed transactions are associated with a transaction type unique for the compressed transactions.

3. The apparatus of claim 1, wherein the compressed block comprises fewer transactions than the input ordered set of the blockchain transactions, the compressed block is a parent of an uncompressed block, and the compressed block is a child of the genesis block.

4. The apparatus of claim 1, wherein the at least one memory and the computer program code are further configured to, with the at least one processor, to cause the apparatus to provide the compressed block to the distributed network with an uncompressed block referencing to the compressed block.

5. The apparatus of claim 1, wherein the at least one memory and the computer program code are further configured to, with the at least one processor, to cause the apparatus to validate the compressed block by checking transaction types and final state of the compressed block.

6. The apparatus of claim 1, wherein interval for chain epochs in the chain and/or number of chain epochs maintained in the chain is adjustable in the distributed network on the basis of one or more of network characteristics, transaction statistics, compressed block characteristics, and network voting decisions.

7. A method comprising:

receiving, by an apparatus connectable to a distributed network, an input ordered set of blockchain transactions of a set of uncompressed blocks in a chain of blocks, the chain of blocks comprising the set of uncompressed blocks after a genesis block or a preceding compressed block in the chain of blocks, generating a compressed block on the basis of the input ordered set of the blockchain transactions, wherein the compressed block comprises less blockchain transactions than the input set of blockchain transactions and the processing of blockchain transactions of the compressed block results to an equivalent final state as processing of the input ordered set of the blockchain transactions, and providing the compressed block to a distributed network to establish a new chain epoch and to replace a set of uncompressed blocks in the chain, wherein the apparatus is configured to generate the compressed block in response to reaching a predetermined number of at least one of: ordered blocks or blockchain transactions added to the chain after the genesis block or the preceding compressed block.

* * * * *